Figure 1:
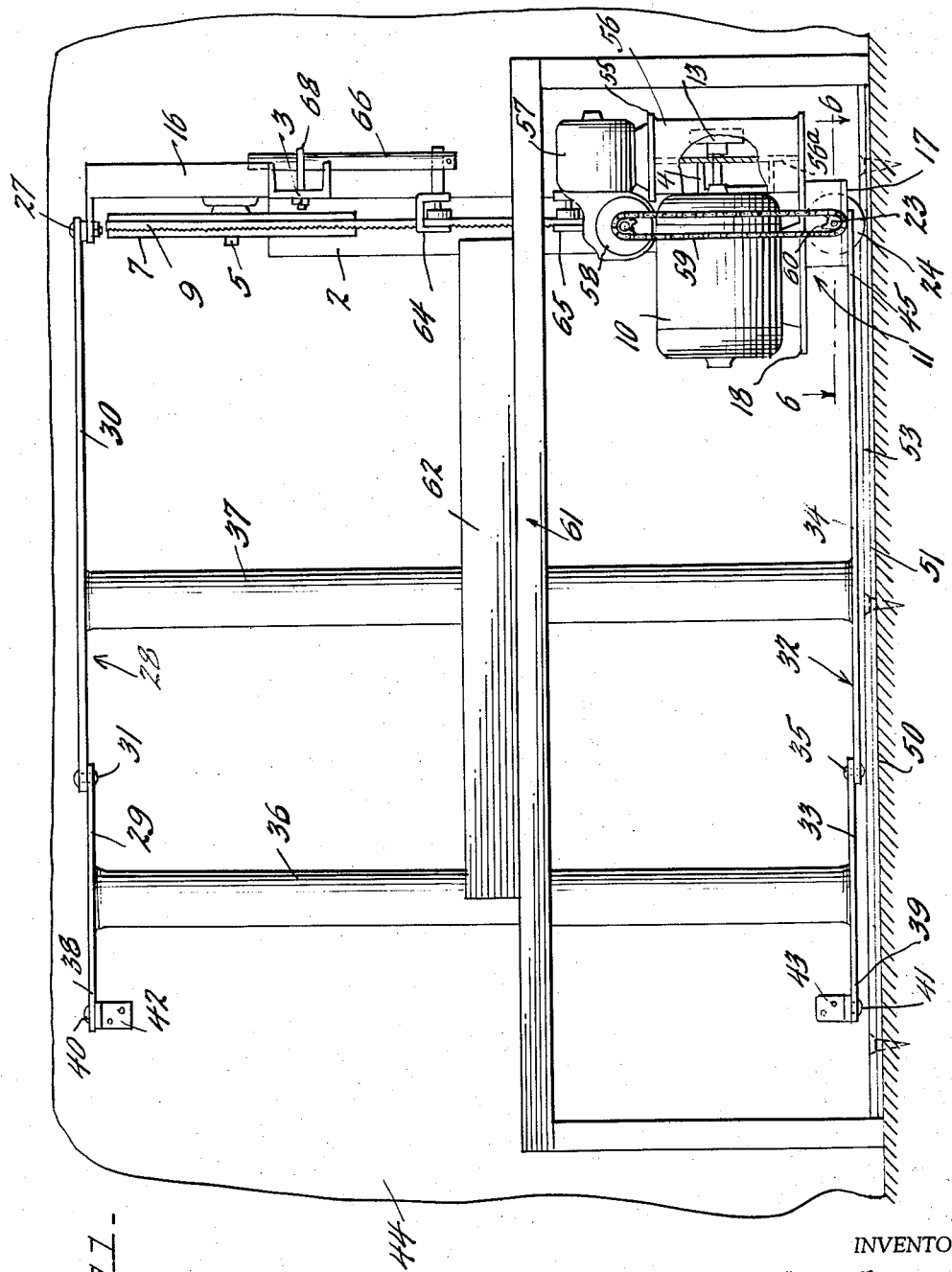

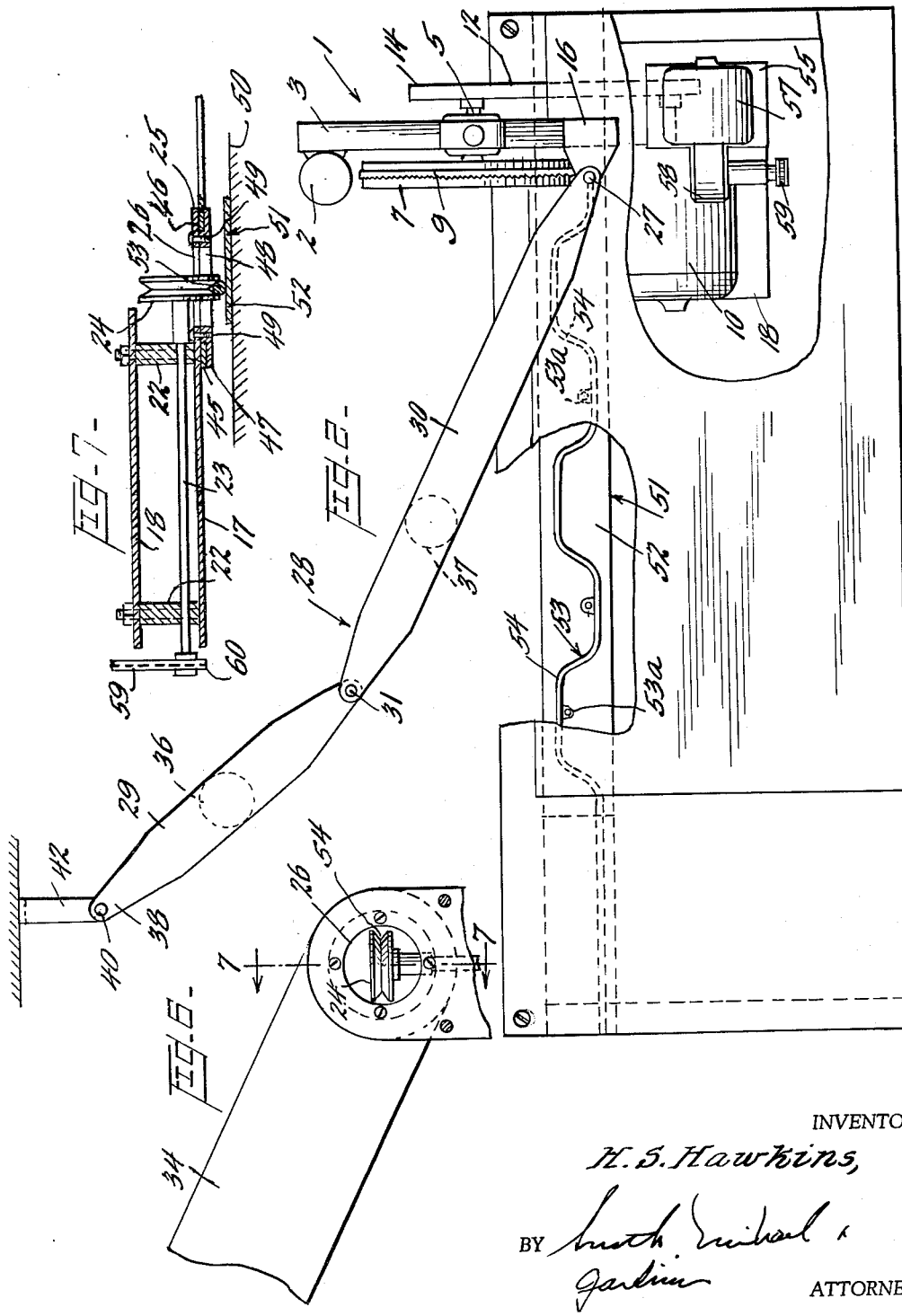

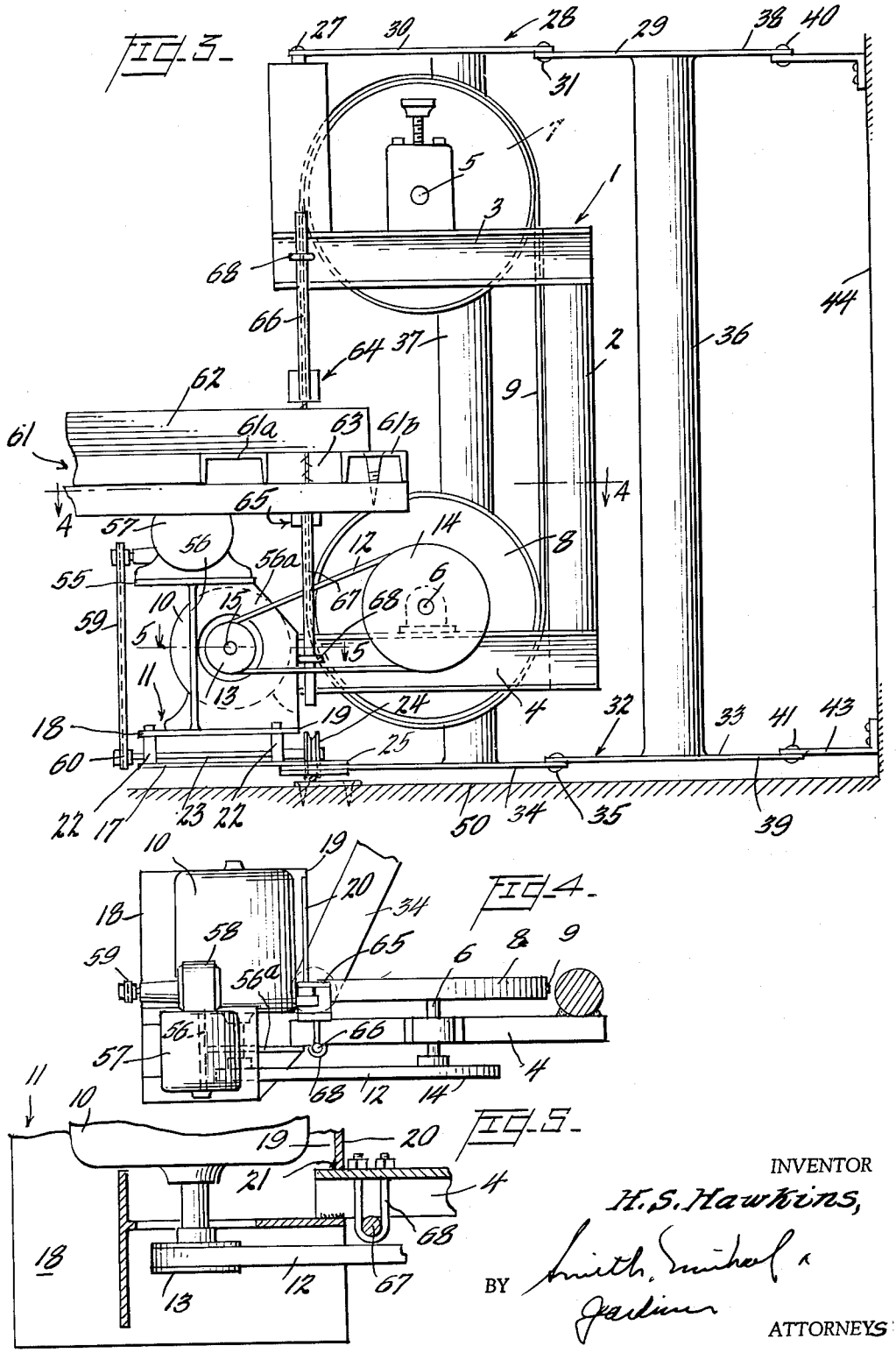

United States Patent Office 3,254,685
Patented June 7, 1966

3,254,685
TRAVELING SAW
Havilah S. Hawkins, Sedgwick, Maine
Filed June 3, 1963, Ser. No. 284,949
21 Claims. (Cl. 143—17)

This invention is a traveling saw including saw work feed means designed to move a saw into engagement with a stationary work piece and to automatically control saw movement to provide in the work piece a saw kerf having predetermined contours as defined by a pattern member associated with the saw machine.

The design of the saw machine is particularly applicable to band saws, but it will be understood from what follows that the principles involved are equally applicable to saws of the saber or jig type.

The machine of the present invention is somewhat similar to the traveling saw described in my copending application Serial No. 284,948, filed June 3, 1963, but the machine of the present invention has been simplified and the general relation between the saw unit and the pattern mechanism improved.

One object of the invention is to provide a saw unit mounted for pivotal and translational movement with respect to a supporting structure, together with power means for driving the saw with respect to a stationary work piece, along a predetermined path determined by a pattern member associated with the machine.

A further object of the invention is to provide in a saw machine of the character described, a novel form of linkage for supporting the saw unit in respect to a worktable and wherein particular attention has been devoted to the distribution of weight of various parts of the saw machine with respect to the axis about which the saw machine may pivot when in operation.

Another object of the invention is to provide a support for a saw unit including spaced articulated arms to the free ends of which the saw is pivotally supported and the provision at the pivot point of the saw unit with the lower arm of means to support a traction roller for the saw unit for rotation about an axis passing through the pivotal axis of the saw unit with respect to the supporting arms therefor. These and other objects of the invention will become apparent from reading the following specification in the light of the acompanying drawings wherein I have shown a preferred embodiment of my invention, and wherein FIGURE 1 is a front elevation of the saw machine,
FIGURE 2 is a plan view of the saw machine,
FIGURE 3 is a side elevation of the saw machine,
FIGURE 4 is a detailed sectional view shown on line 4—4 of FIGURE 3,
FIGURE 5 is a partial sectional view taken on the line 5—5 of FIGURE 3,
FIGURE 6 is a detail plan view of the mounting for the traction roller, taken on the line 6—6 of FIGURE 1, and
FIGURE 7 is a partial sectional view taken on the line 7—7 of FIGURE 6.

Referring more particularly to the accompanying drawings, the sawing machine of my invention comprises a saw unit indicated generally by the reference character 1, which is shown more clearly in FIGURE 3. The saw unit comprises a frame structure comprising upright frame member 2, an upper generally horizontal frame member 3, and a lower generally horizontal frame member 4. The frame members 2, 3 and 4 may be of any desired cross sectional contour but for convenience the arms 3 and 4 are shown as channel members and the upright frame member 2 as of circular cross section and these members are connected in a manner to provide a supporting frame of general C-shape as shown.

The upper and lower frame members 3 and 4 support shaft members 5 and 6 respectively for rotation about generally horizontal axes, the axes being generally parallel to each other. The shafts 5 and 6 carry pulley members 7 and 8 respectively, about which is trained a band saw element 9. The band saw 9 is driven through power means in the form of a motor 10 supported on a motor supporting structure indicated generally at 11, connected to the main frame of the saw unit in a manner to be more particularly described hereinafter. The motor 10 drives the saw 9 by means of a belt or chain member 12 operatively engaged with pulley or sprocket members 13 and 14 associated respectively with a motor shaft 15 and the pulley shaft 6, as clearly shown in FIGURE 3.

The saw unit as thus described is mounted for pivotal movement and translational movement with respect to a supporting structure and to this end the main frame, at the outer free end of the arm 3 is provided with an upstanding frame member 16. At the lower end of the frame and more particularly at the outer end of the lower frame member 4, there is provided means for supporting the frame for pivotal movement at its lower end, said means comprising a plate 17 carried by the motor supporting structure 11. The motor supporting structure 11 includes a base plate 18 which carries along its inner edge 19 an upstanding flange 20 which is welded or otherwise secured at 21 to the forward or outer free end of the lower frame member 4. The plate 17 is secured to the underside of the plate 18 and in spaced relation thereto by spaced bolt 22. Mounted on the upper face of the plate 17 and between plates 17 and 18 is a shaft 23 which is disposed generally parallel to the frame members 3 and 4 and generally perpendicular to the plane of movement of the saw 9. The shaft 23 carries a peripherally grooved roller 24 at its inner end and the median plane of said roller coincides substantially with the plane of the saw blade 9, as will be more particularly described later herein.

The plate 17 at its free inner end 25 is provided with a generally circular aperture 26 positioned to receive and embrace the roller 24 as clearly shown in FIGURES 6 and 7. The apertured end 25 of the plate 17 provides a lower pivotal support for the saw frame as will presently appear.

As previously referred to, the saw unit is mounted for pivotal and transitional movement with respect to the supporting structure, and to this end the upright frame member 16 carries pivot means 27 which is connected to the outer free end of an articulated arm or linkage system indicated generally at 28. The upper articulated arm 28 comprises an inner link member 29 and an outer link member 30 pivotally connected by pivot means 31 in end-to-end relation as clearly shown in FIGURE 3. The lower part of the supporting structure comprises a similar articulated arm 32 comprising an inner link member 33 and an outer link member 34 interconnected in end-to-end relation by pivot means 35 as shown. The pivot means 31 and 35 are arranged in coaxial relation and the pivot 27 is coaxially disposed with respect to the center of the aperture 26 in the inner end 25 of plate 17. Also, the pivotal axis of pivot 27 passes through the axis of rotation of the shaft 23. The inner links 29 and 33 of the articulated arms 28 and 32 are rigidly connected together by an upright strut 36 and similarly, the outer link members 30 and 34 of the articulated arms 28 and 32 are rigidly connected together by an upright strut 37. Thus, the corresponding link members of the upper and lower articulated arms form a linkage system and move pivotally about their respective pivots 31 and 35 as a unit. The inboard ends 38 and 39 of the respective articulated arms 29 and 33 are pivotally connected at 40 and 41 to suitable supporting brackets 42 and 43 which in turn are connected to any suitable supporting structure indicated generally by the reference character 44. The supporting structure 44 may be a wall member or an upright strut, beam, or column, of sufficient strength to rigidly support the entire machine and structure as described.

The outer end 45 of the other link member 34 of the lower articulated arm 32 is provided with an aperture 46 somewhat larger in diameter than the aperture 26 in the plate 17, but concentric therewith, as clearly shown in FIGURE 7. The end 45 of the link 34 underlies the plate 17 with its aperture 46 aligned with the aperture 26 of the plate 17, and a further ring plate 47 having an aperture 48 is secured to the end 25 of plate 17 by suitable bolt members 49 in a manner such that the motor supporting structure 11 has free swinging or pivotal movement about the axis of upper pivot 27, which as described, passes through the axis of roller 24.

The roller 24 carried by the shaft 23, is a traction roller and also functions to support the weight of the saw unit. Thus, a generally horizontal supporting surface 50 is provided (see FIGURE 3) which may be a floor, or any horizontally supporting surface of a suitable supporting structure or framework. The surface 50, at a point outwardly from the upright surface 44 to which the supporting brackets 42 and 43 are secured carries or supports pattern member 51 which functions to direct the saw unit along a predetermined path of movement as will presently appear. The pattern member 51 as shown in FIGURE 2 comprises an elongated base member 52 carrying on its upper surface a pattern rib member 53 which, in the direction of elongation of the base member 52, is provided with undulations such as at 54 which function to define the path of movement of the saw by engagement therewith of the traction roller 24. The pattern rib member 53 may be secured to the base member 52 in any convenient manner such as by lugs 53a, and as shown, the rib member 53 is preferably generally circular in cross sectional contour to provide laterally spaced areas of contact between it and the grooved roller 24 as will hereafter appear. This relationship is clearly shown in FIGURE 3. The traction roller 24 as shown more clearly in FIGURE 6 is provided with a peripheral groove 54 which, in cross section, is generally V-shaped with the vertex of the V lying substantially in the median plane of the roller and substantially coplanar with the plane of movement of the saw while the axis of the roller passes through or coincides with the path of movement of the cutting edge of the saw, as shown diagrammatically in FIGURE 7.

The pattern members 53 per se are more fully described in my copending application Serial No. 284,948 and as are described, preferably include a central portion carrying the rib with the pattern defining undulations, and these central portions are interchangeable with relatively fixed terminal portions, the latter carrying relaitvely straight rib sections onto which the saw unit may be moved, preferably at either end, so that the saw unit may be "parked" on one or the other of these terminal sections while the central section is being replaced by another pattern section having a different contour or pattern forming delineations therein.

Means are provided for driving the traction roller while in engagement with the pattern rib 53 in order to move the saw unit along a predetermined path determined by the pattern rib. To this end the motor supporting structure 11 includes a second motor supporting plate 55 supported above and in spaced relation to the plate 18 by conventional upstanding flanges or rib members 56 and 56a, and mounted on plate 55 is a motor 57 which is connected through suitable reduction gearing 58 and sprocket chain 59 to the sprocket 60 carried by the shaft 23. Thus, the traction roller 24 may be driven at a desired speed for moving the saw through a suitable work piece.

Intermediate the upper and lower frame members 3 and 4 a worktable 61 is provided and may be supported in any convenient manner by end supports as shown, to provide a work surface on which a work piece 62 may be supported for presentation to the saw member 9. The saw table 61 is provided with an elongated slot or space 63 within which the saw blade 9 moves as the saw unit traverses the pattern rib 53 in response to driving traction from the traction roller 24.

In order to guide the saw blade 9 adjacent the upper and lower surfaces of the work table 61, I provide saw guide means shown generally at 64 and 65. These guide means include means for embracing the saw blade and provide means for engaging the saw on its lateral faces to maintain the saw in a substantially straight-line path of movement, as well as means for engaging the rear edge of the saw blade to prevent deformation of the saw rearwardly while in engagement with a work piece. These saw guides per se form no part of the present invention and are described more particularly in my Patent No. 2,934,107 of April 26, 1960.

The saw guide members 64 and 65 respectively are adjustably mounted on the upper and lower frame members 3 and 4 as clearly shown in FIGURE 3, and are carried by vertical standards or rods 66 and 67 respectively, which are adjustably secured to the outer ends of the frame members 3 and 4 by U-shaped clamping bolts 68 which, as shown in FIGURE 5, embrace the respective rods 66 and 67 and adjustably secure the rods to the respective frame members as shown.

Having thus described a preferred embodiment of my invention, it will be understood, in use, that a work piece such as 62 is secured to the worktable 61 in any desired manner and associated with the space 63 in the saw table through which the saw operates in a manner such that the saw will traverse that area of the work piece which is designed to be provided with a predetermined contour corresponding to a rib-carrying pattern piece to be traversed in a manner described, by the traction roller 24. The motor 10 for driving the saw blade is then placed in operation and with the saw blade properly aligned with that portion of the work piece to be cut, the motor 58 driving the traction roller 24 is energized whereupon the traction roller which has been engaged with the pattern rib of the pattern piece, will function as a traction and guide roller with respect to the rib and move the saw unit along the work piece in a path determined by the contour of the pattern rib. This movement of the saw both pivotally and translationally is possible by reason of the described mounting of the saw unit with respect to the articulated arms or linkage systems by which the saw is supported from the brackets 42 and 43. When the saw unit has made a complete traverse of the work piece, it is "parked" on one of the straight terminal portions of the pattern as described, and the work removed from the saw and replaced by a second work piece. If the second piece of work is to be provided with the same contoured edge, the saw unit is moved to the opposite end of the machine by reversing the direction of rotation of the motor 58 which drives the traction roller 24. The motor 58 and its reversing circuitry are purely conventional and form no part of the present invention.

It should be noted in respect to FIG. 3 where the worktable is shown as including spaced parallel channel members 61a, 61b that the innermost channel member 61b is positioned to support the inner end of the work piece 62 so as to preclude undue vibration of the work piece during the operation of the saw. The channel member 61b may be removably attached to the underlying support therefor in any convenient manner such as by screws as shown. The channel member 61b as thus positioned provides a space between it and the channel member 61a within which the saw blade may travel, it being understood of course that the removability of the channel member 61b permits the saw to be entered in said space.

In view of the foregoing it is apparent that I have provided a traveling saw which includes several features of improvement over and above what was shown in my copending application Serial No. 284,948, filed June 3, 1963. Thus, by reason of the improved linkage mounting for the saw unit, the saw unit is free to swing through an arc of 360° about the axis through the pivot 27. Furthermore, the mounting means for the lower pivot of the saw frame with respect to the linkage system which supports it permits the use of but a single pattern rib or track member and but a single traction and guide roller in contrast to the dual patterns and guide rollers shown in my copending application.

It will be understood that the saw machine as described herein, is but a preferred arrangement given for purposes of illustration only and that those skilled in the art to which the invention relates, will realize that various changes may be made in the size, proportion and arrangement of parts without departing from the spirit of the invention which is defined more clearly in the appended claims.

I claim:

1. A traveling band saw adapted to be supported from a supporting structure and comprising a saw unit including frame means, band saw pulley means mounted for rotation on the frame means, a band saw having a cutting edge trained about said pulley means, and means for driving the band saw; means for mounting said saw unit for pivotal and for translational movement with respect to the supporting structure to which the traveling band saw may be attached, said mounting means including a pair of articulated supporting arms adapted to be attached to a supporting structure in vertically spaced parallel relation for pivotal movement about a substantially vertical axis, and means on said arms for supporting the saw unit for pivotal movement, said saw being mounted with its cutting edge in substantially coaxial alignment with the pivotal connection of the saw unit to said articulated arms.

2. The traveling saw described in claim 1 wherein the articulated arms each includes a pair of link members pivotally connected in end-to-end relation about a common axis and means rigidly connecting together corresponding links of each pair of links.

3. The traveling saw described in claim 1 wherein the saw has a cutting edge in general coaxial alignment with the pivotal axis of the saw unit on said articulated arms.

4. The traveling saw described in claim 1 wherein a supporting structure is provided to which said articulated arms are pivotally connected in vertically spaced parallel relation and wherein a saw table is disposed between said arms, a pair of saw guides mounted on said frame means above and below the saw table, and respectively extending towards the saw table, said saw guides including means embracing the saw to guide the same with respect to a workpiece supported on the saw table.

5. The apparatus described in claim 4 wherein means are provided for adjusting said saw guides towards and away from the saw table.

6. The traveling saw described in claim 4 wherein means is provided for bodily moving the saw unit over the saw table and with respect to said supporting structure.

7. The traveling saw described in claim 6 wherein pattern means are provided for controlling the path of movement of the saw unit.

8. The traveling saw described in claim 7 wherein said means for bodily moving the saw unit comprises traction means operatively engaging the pattern means, and means for driving the traction means.

9. The traveling saw described in claim 8 wherein the traction means comprises a peripherally grooved roller mounted on the saw unit with the median plane of said roller generally coplanar with the plane of the saw, and with the axis of said roller aligned generally with the cutting edge of the saw.

10. The traveling saw described in claim 9 wherein the peripheral groove in said roller is substantially V-shaped in cross section and wherein the apex of said V is in substantially coplanar relation to the plane of the saw, and wherein the pattern means comprises a track member contoured longitudinally to provide pattern features, the flanges on the peripheral edges of the roller engaging the pattern track member along laterally-spaced longitudinally-extending lines thereby causing the saw unit to swing about the pivotal support with said articulated arms as the saw unit moves along said pattern track under the influence of said traction means.

11. The traveling saw described in claim 8 wherein a motor support is provided on said saw unit, a motor mounted on said support, said traction means including a roller carried by said saw unit for rotation about an axis substantially perpendicular to the pivotal axis of said saw unit, and means for drivingly connecting said motor with said roller.

12. The traveling saw described in claim 8 wherein a motor support is provided on said saw unit frame, a motor mounted on said support, and means drivingly connecting said motor with said saw.

13. The traveling saw described in claim 12 wherein a second motor is mounted on said support and wherein said traction means includes a roller carried by said saw unit for rotation about an axis substantially perpendicular to the pivotal axis of said saw unit, and means for drivingly connecting said second motor with said roller.

14. The traveling saw described in claim 13 wherein said second motor is mounted above and in overlying relation with respect to said first-mentioned motor.

15. The traveling saw described in claim 13 wherein said support carrying the two motors and the saw frame and mounting means for the saw are spaced on opposite sides of the pivotal axis of the saw unit whereby to substantially balance the respective weights thereof with respect to the pivotal axis.

16. The traveling saw described in claim 1 wherein said articulated arms are mounted one above the other and the pivotal connection between the saw unit and the articulated arms includes a bearing ring structure disposed between the saw unit and the lower arm for rotation about an axis passing through the pivotal axis of the saw unit with respect to the articulated arms, and wherein said saw frame includes a support for a traction roller mounted on the frame for rotation about an axis substantially perpendicular to the pivotal axis of the saw unit, said traction roller being disposed within said bearing ring with the median plane of the roller in generally coplanar relation to the plane of the saw and with the axis of the roller substantially aligned with the cutting edge of the saw and substantially perpendicular to the plane of the saw.

17. The traveling saw described in claim 16 wherein the pattern track is substantially circular in cross section.

18. The traveling saw described in claim 16 wherein the pattern means comprises a track member including a contoured central portion and a pair of relatively straight terminal portions, the central portion being interchangeable with the terminal portions to provide for "parking" the saw unit on one or the other of said straight terminal portions for ready removal of the central portion to provide for pattern change.

19. In a traveling saw, a saw unit including a saw and means for driving the saw, means for mounting the saw unit for pivotal and translational movement with respect to a supporting structure and including a pair of vertically spaced arms, upper and lower pivot means connecting the saw unit to said arms respectively, said lower pivot means including an apertured plate carried by the saw unit and disposed in a generally horizontal plane with the aperture thereof disposed in alignment with respect to the upper pivot means, a supporting roller carried by the saw unit and disposed within said aperture with the axis of said roller passing through the pivot axis of the upper pivot and generally perpendicular thereto, said lower arm being provided with an aperture disposed in alignment with the aperture in said plate and means for securing the plate and arm together for relative movement about said axis.

20. The apparatus described in claim 19 wherein said supporting roller is positioned with its median plane substantially coplanar with the plane of the saw.

21. A traveling saw adapted to be supported from a supporting structure, said traveling saw comprising a saw unit including a saw and means for driving the same, means for mounting the saw unit for pivotal and transitional movement with respect to said supporting structure, said mounting means including a pair of articulated arms pivotally mounted from the supporting structure in spaced, generally parallel relation, means at the outer free ends of said arms for supporting said saw unit for pivotal movement in respect thereto, a saw table disposed between said arms, means for bodily moving the saw unit with respect to the saw table, a pattern member mounted below the saw table and traction means carried by the saw unit and engaged with said pattern means, said traction means including a single roller disposed with its axis in alignment with the cutting edge of the saw and its median plane substantially coplanar with the plane of the saw and means for driving said roller.

References Cited by the Examiner
UNITED STATES PATENTS

| | | | |
|---|---|---|---|
| 799,825 | 9/1905 | Behee | 90—13.3 |
| 961,453 | 6/1910 | Krawchenko | 143—17.1 |
| 1,825,182 | 9/1931 | Dose | 90—13.2 |
| 2,535,182 | 12/1950 | Weaver | 143—46.47 X |
| 2,736,349 | 2/1956 | Francis | 143—26.2 |

DONALD R. SCHRAN, *Primary Examiner.*